United States Patent [19]

Ishii et al.

[11] 4,195,925
[45] Apr. 1, 1980

[54] DIAPHRAGM-OPERATING DEVICE FOR USE IN AN INTERCHANGEABLE-LENS TYPE CAMERA

[75] Inventors: Haruo Ishii, Wako; Akihiro Arai, Urawa, both of Japan

[73] Assignee: Asahi Kogaku Kogyo Kabushiki Kaisha, Tokyo, Japan

[21] Appl. No.: 911,576

[22] Filed: Jun. 1, 1978

[30] Foreign Application Priority Data

Jun. 1, 1977 [JP] Japan .................................. 52-64220

[51] Int. Cl.² .............................................. G03B 9/02
[52] U.S. Cl. .................................................... 354/270
[58] Field of Search ................ 354/270, 272, 273, 274

[56] References Cited

U.S. PATENT DOCUMENTS

| | | | |
|---|---|---|---|
| 3,537,375 | 11/1970 | Kiper et al. | 354/273 |
| 3,680,458 | 8/1972 | Nomura | 354/272 |
| 3,831,181 | 8/1974 | Nozawa | 354/270 |
| 3,854,811 | 12/1974 | Araki | 354/270 |
| 3,958,868 | 5/1976 | Mizuki | 354/27 |

Primary Examiner—Monroe H. Hayes
Attorney, Agent, or Firm—Sughrue, Rothwell, Mion, Zinn and Macpeak

[57] ABSTRACT

A series of spring biased pivoting members are provided for controlling the diaphragm stop-down and mirror retraction operations. The diaphragm stop down occurs prior to mirror retraction in order to allow time for any "bouncing" of the mechanism to dissipate and the required winding force is relatively low since only a single spring must be overcome in order to set the mechanism.

5 Claims, 7 Drawing Figures

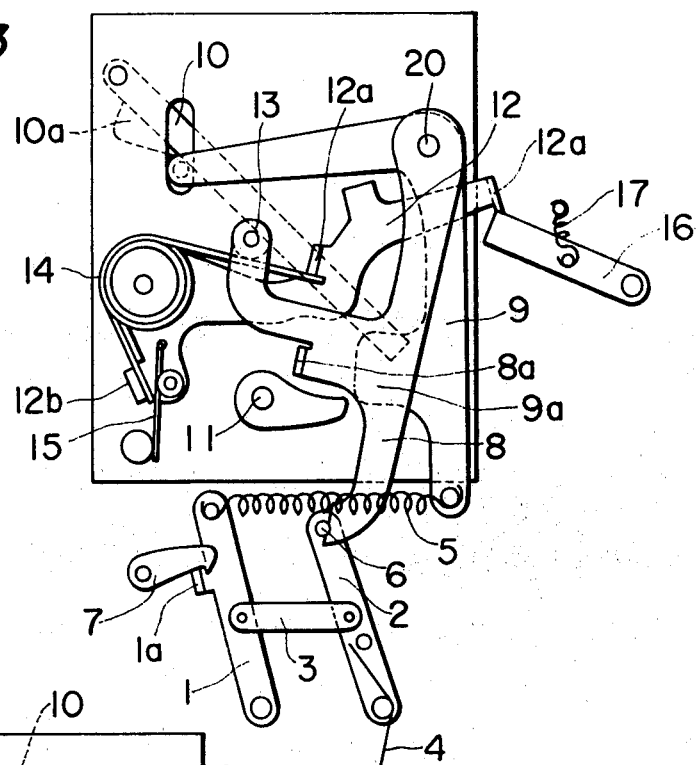
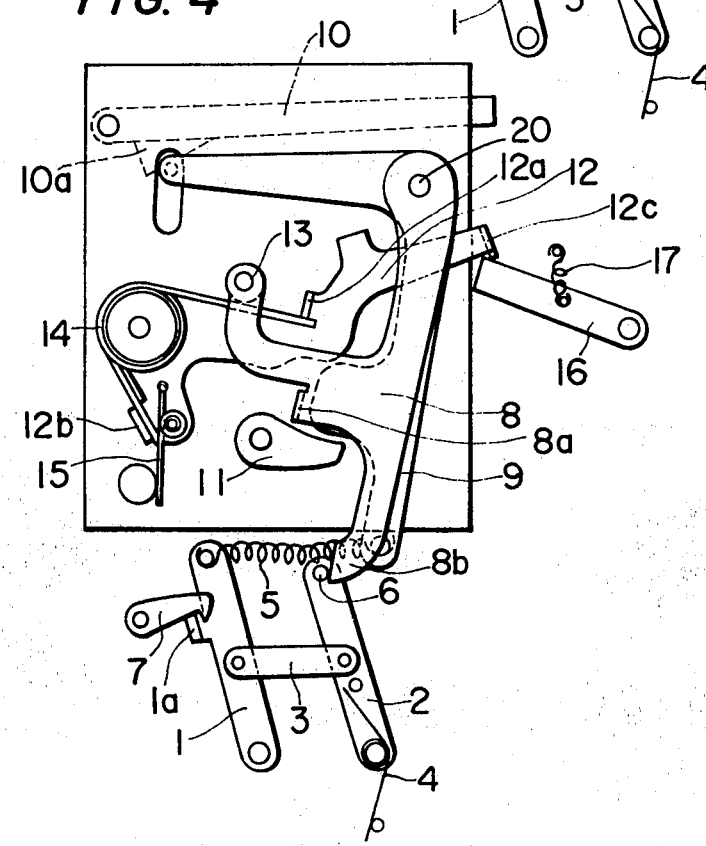

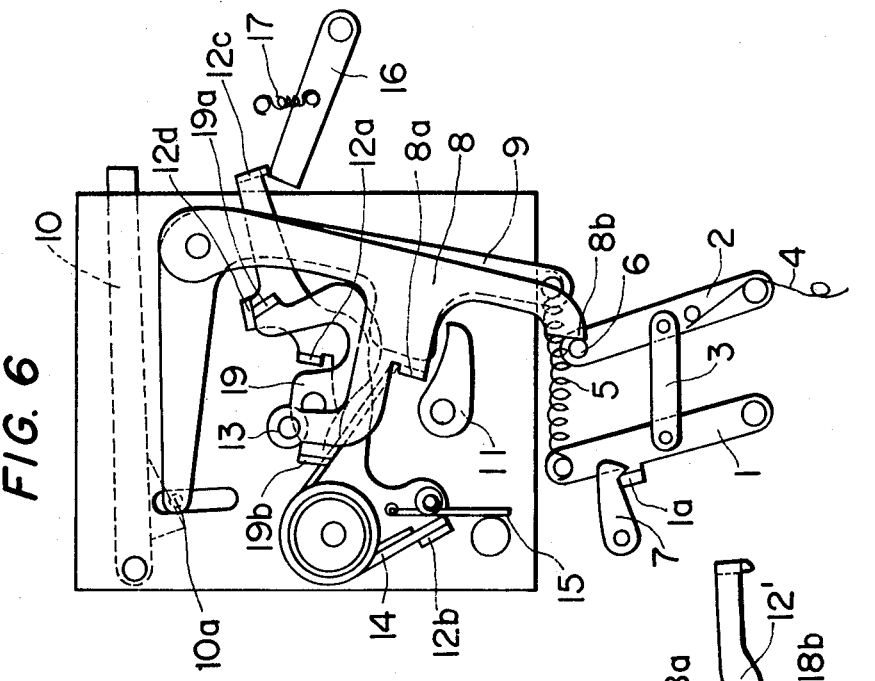
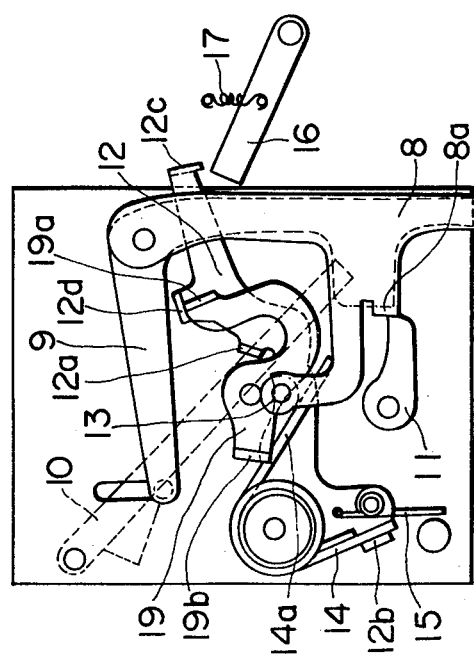
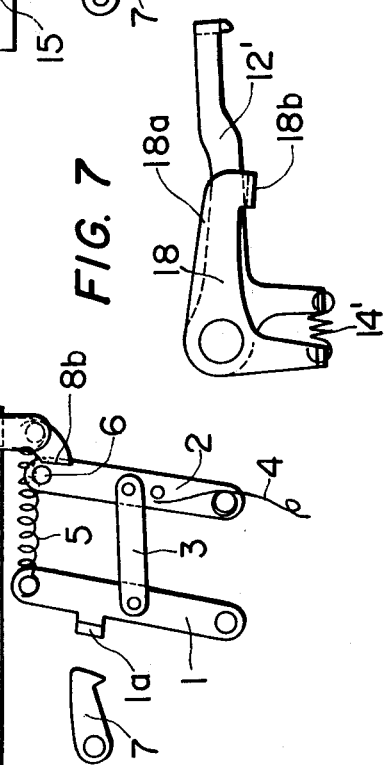

DIAPHRAGM-OPERATING DEVICE FOR USE IN AN INTERCHANGEABLE-LENS TYPE CAMERA

BACKGROUND OF THE INVENTION

Various kinds of automatic aperture control lenses are known, in which the lens aperture is stopped down prior to the operation of a shutter and then the lens aperture is brought to its fully open position after the operation of the shutter. In this case, a relatively large force is required for operating a lens diaphragm without bouncing, quickly, and in a stable manner, and this requires an increase in the operating force (winding torque) of the camera.

SUMMARY OF THE INVENTION

The present invention is directed to improvements, whereby the diaphragm may be operated quickly and provided with an allowance for bouncing, while minimizing the winding torque for a camera.

Briefly, this is accomplished by providing a series of spring-biased pivot members, an internally biased diaphragm operating member for setting and releasing a spring biased diaphragm stop-down mechanism, a driving member for moving the mirror when unlocked and, when locked, for abutting the operating member to prevent the stop-down operation and a spring biased linkage for setting the entire mechanism when exposure is completed. An additional pivotting member for manually operating the diaphragm stop-down mechanism is also provided.

BRIEF DESCRIPTION OF THE DRAWINGS

FIG. 3 is a side view of one embodiment of the invention, after the stop-down operation;

FIG. 4 is a side view of one embodiment of the invention, after the mirror movement;

FIG. 5 is a side view of one embodiment of the invention, in which a manual stop-down operation is accomplished;

FIG. 6 is a side view of one embodiment of the invention, in which the manual stop-down operation and the lifting operation of a mirror are accomplished; and FIG. 7 is a side view showing an essential part of a swinging lever provided in a separated condition, according to the present invention.

DETAILED DESCRIPTION OF THE INVENTION

Figure 1:
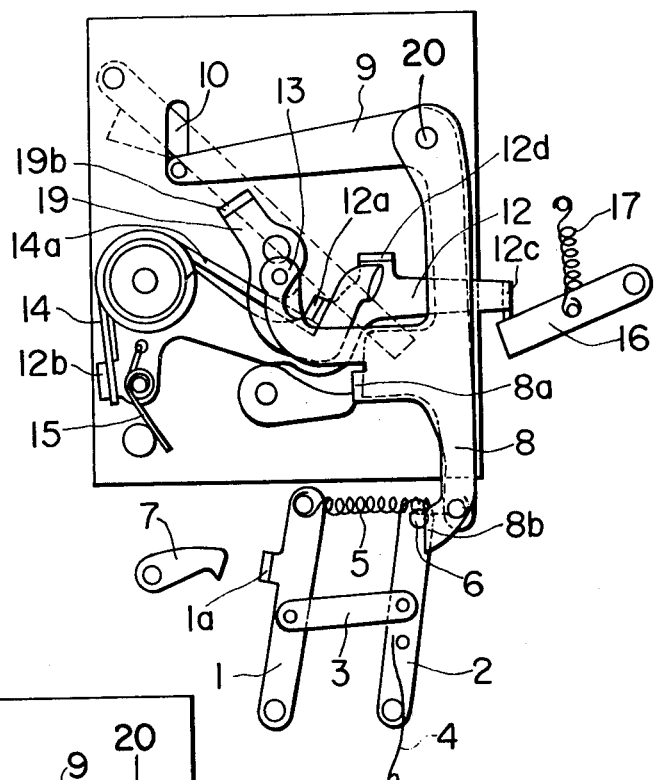
FIG. 1 is a side view of one embodiment of the invention, before the charging operation.
Figure 2:
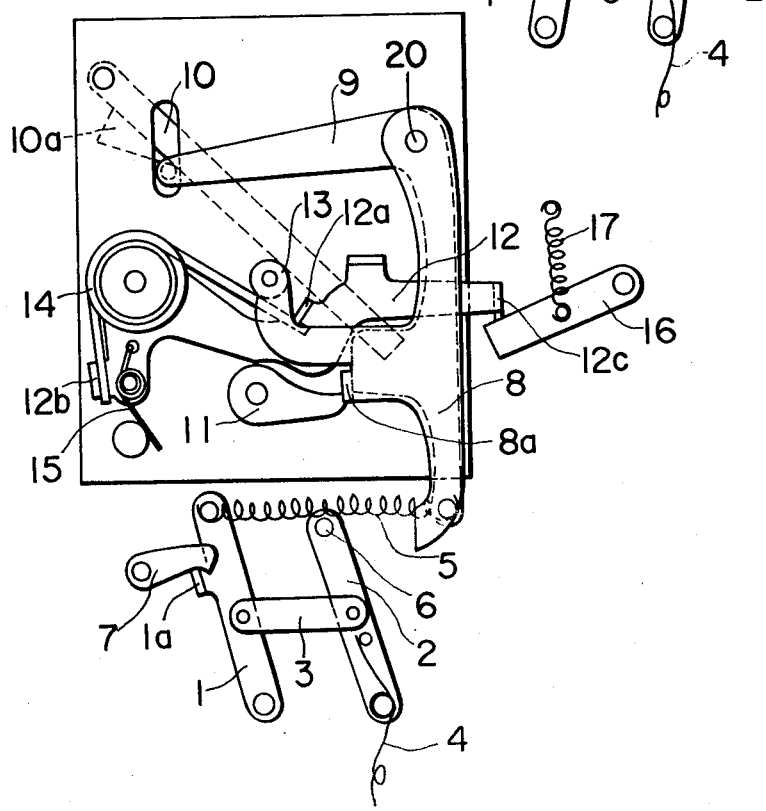
FIG. 2 is a side view of one embodiment of the invention, after the charging operation.

FIG. 1 shows the present invention in a condition prior to winding and charging operations. Shown at 1 is a charging lever, which is linked to a return lever 2 through the medium of a connecting rod 3. As shown in FIG. 2, a lifting spring 5 and a return spring 4 are elastically deformed by means of a winding mechanism (not shown), and then an engaging portion 1a of the charging lever 1 is locked by a locking lever 7, thus completing the charging operation of a film. A lifting lever 9 is pivotally supported on a shaft 20 and the driving force of the lifting spring 5 in FIG. 2 acts on the lifting lever 9 serving as a mirror driving member. However, the lifting lever 9 is engaged by an engaging portion 8a of the stop-down priority lever 8 which, in turn, is abutted by a locking lever 11. A roller 13 is provided on one end portion of the stop-down-priority lever 8, and abuts an arm portion 14a of a release spring 14 which is held in position by means of spring hook portions 12a, 12b. Since spring 14 is an internal spring, i.e., both ends are anchored to the same member 12, its force will not affect the operation of the overall mechanism until it becomes necessary to accomodate any excess downward movement of the roller 13. By pressing downward on the arm 14a of the spring, the other end of the spring causes the lever 12 to pivot clockwise, thereby bringing a swinging lever 12, serving as a diaphragm operating member, to its initial position against the action of the stop-down-priority spring 15, so that a release plate 16 for a lens may be returned to its initial position against the action of a stop-down spring 17. The member 12 will pivot clockwise against the forces of springs 15 and 17 until the position of FIGS. 1 and 2 is achieved and, the release plate 16 is fully charged, and further downward pressure by the roller 13 will merely result in the deformation of the resilient member 14a.

As shown in FIGS. 3 and 4, upon taking a picture, a mirror seat 10 is lifted and retracted from its position only by releasing the locking lever 11. That is, the stop-down-priority lever 8 is a rotated through the medium of a release spring 14 serving as a resilient member and pressing upwardly on the roller 13 as the swinging lever 12 is rotated under the actions of the stop-down-priority spring 15 and stop-down spring 17. The stop-down operation is then accomplished by means of a known lens stop-down mechanism not shown. When the stop-down-priority lever 8 is rotated, then the engaging portion 8a of the lever 8 disengages from the lifting lever 9, so that the lifting lever 9 is then rotated under the action of the lifting spring 5, and then a cam surface 10a of the mirror seat 10 is lifted by means of a pin provided on one end portion 9a of the lifting lever 9, thereby lifting a mirror as shown in FIG. 4.

Although not shown, the shutter is then operated, and the locking lever 7 is released upon the completion of exposure. Thus, the return lever 2 is returned to its initial position (FIG. 1) under the operating force of the return spring 4, whereupon the charging lever 1 and connecting rod 3 are returned to their initial positions together. The stop-down-priority lever 8 is returned to its initial position by means of a pin 6 provided on one end portion of the return lever 2, and then the lifting lever 9 is returned to its initial position through the medium of the engaging portion 8a, with the result that the mirror sear 10 is returned to its initial position. At the same time, the swinging lever 12 is returned to its initial position by means of the release spring 14, since roller 13 provided on one end portion of the stop-down-priority lever 8 presses down on the upper arm 14a. One end 12c of the swinging lever 12 engages a lens, thereby releasing a diaphragm (not shown) through the medium of a release plate 16 against the action of a spring 17 (FIG. 1). The description given thus far refers to a series of sequences in the normal operation of the camera.

Referring to FIGS. 5 and 6, a description will now be given of the manual stop-down operation for confirming the depth of field. A seesaw lever 19, not shown in FIGS. 2 through 4, is provided for this purpose. In the normal operation, the seesaw lever 19 has no bearing on the swinging lever and release spring 14 at all. In the manual stop-down operation, one end 19a of the lever 19, as shown in FIG. 5, opens the swinging lever 12, while the other end 19b of the lever with respect to the pivot opens the release spring 14, relatively, thereby bringing the arm 14a of the release spring 14 out of a moving locus of the roller 13 provided on the lever 8, whereupon the diaphragm spring 17 moves the release plate 16 for a stop-down operation. For releasing the manual stop-down condition, the seesaw lever 19 is brought back to its initial position. In addition, when the seesaw lever 19 is operated in the manual stop-down condition as shown, since the swinging lever 12 and release spring 14 are no longer coupled to the stop-down-priority lever 8, the return spring 4 and lifting spring 5 may accomplish the same actions as in the normal condition described above. The release spring 14 will then overcome the stop-down spring 17, so that the swinging lever 12 may return the release plate 16 to its initial position, thereby opening an aperture for a lens. In the event that the release plate 16 stops halfway due to a manufacturing variation in accuracy, the swinging lever 12 as well would stop halfway; however, the roller 13 provided on the stop-down-priority lever 8 may press on and aid the release spring 14, so as to release the stop-down-priority lever 12 to return same to its initial position.

As shown in FIG. 7, the aforenoted operation may likewise be accomplished if a cam lever 18 is provided in coaxial relation to the swinging lever 12', with a release spring 14' provided between the levers 18 and 12'. In this case, a side surface of the cam lever 18, which replaces the arm portion 14a of the release spring 14, may be brought into engagement with the roller 13 provided on the stop-down-priority lever 8. Furthermore, the aforenoted engaging surface may be used as a cam surface, and a force required for returning the swinging lever 12' after the stoppage thereof may be controlled, by utilizing the relationship between the action direction of the release spring 14' and the axial position of the stop-down-priority lever 8.

With the arrangment according to the present invention, the stop-down operation is accomplished prior to the lifting of the mirror, a time allowance is provided for the bouncing to dissipate, and the force required for returning the mirror and diaphragm may be minimized due to the series of pivotting operations, thus achieving a lens-interchangeable type camera having a diaphragm operating device affording a lowered winding torque. In addition, the present invention may be applied to a camera which is not of a stop-down-priority type. For example, the same results of the diaphragm operating device may be retained even in the case where the stop-down-priority lever 8 is provided integrally with the lifting lever 9.

What is claimed is:

1. A diaphragm operating device for an interchangeable-lens camera of the type having a diaphragm operating lever for operating a diaphragm or stop-down mechanism for a lens to charge said diaphragm or stop-down mechanism:

said diaphragm operating lever being pivotally mounted on a first pivot member, and said diaphragm operating lever having a resilient member;

a driving lever pivotally mounted on a second pivot member and having an abutment portion for engaging said resilient member;

means for applying an operating force to said operating lever to urge said resilient member into engagement with said driving lever;

means for releasably holding said driving lever in a first position against said operating force to thereby hold said operating lever in a corresponding first position;

a mirror;

a lifting lever pivotally mounted on said second pivot member, said lifting lever being operatively coupled to said mirror to lift said mirror from a lowered position when said lifting lever is in a first position corresponding to the first positions of said driving member and said operating member and to lift said mirror to a raised position when said lifting member is in a second position;

means for applying a driving force to said lifting lever to urge said lifting lever from its first position to its second position;

an engaging portion on one of said driving lever and said lifting lever for engaging the other one of said driving lever and said lifting lever when said driving lever and said lifting lever are in their said first positions but permitting said driving lever to be disengaged from said lifting lever, the forces applied by said operating force applying means and said driving force applying means being such that said driving lever moves ahead of said lifting lever upon said driving lever being released by said releasing means to provide a sufficient time for bouncing to dissipate.

2. A diaphragm-operating device according to claim 1, further comprising:

a manually operable seesaw lever, one end of which abuts said diaphragm operating lever and moves said diaphragm operating lever against said operating force.

3. A diaphragm-operating device for use in an interchangeable-lens type camera according to claims 1 or 2, wherein said resilient member is a torsion spring, at least one arm of said torsion spring engaging said driving lever.

4. A diaphragm-operating device for use in an interchangeable-lens camera according to claims 1 or 2 wherein said operating force applying means comprises a release plate pivotally mounted on a third pivot member, said release plate having an end portion in abutment with an end portion of said diaphragm operating lever wherein said operating force applying means comprises spring means for applying a pivoting force to said release plate.

5. A diaphragm-operating device for use in an interchangeable-lens camera according to claims 1 or 2 further comprising means for limiting the rotational movement of said diaphragm operating lever in the direction of said operating force.

* * * * *